(12) United States Patent
Matichuk

(10) Patent No.: US 7,269,580 B2
(45) Date of Patent: Sep. 11, 2007

(54) APPLICATION INTEGRATION SYSTEM AND METHOD USING INTELLIGENT AGENTS FOR INTEGRATING INFORMATION ACCESS OVER EXTENDED NETWORKS

(75) Inventor: Bruce Matichuk, Sherwood Park (CA)

(73) Assignee: Celcorp, Inc., Edmonton (CA)

( * ) Notice: Subject to any disclaimer, the term of this patent is extended or adjusted under 35 U.S.C. 154(b) by 247 days.

(21) Appl. No.: 09/801,795

(22) Filed: Mar. 9, 2001

(65) Prior Publication Data

US 2004/0075692 A1      Apr. 22, 2004

Related U.S. Application Data

(60) Provisional application No. 60/237,276, filed on Oct. 3, 2000.

(51) Int. Cl.
G06F 17/00      (2006.01)
G06N 7/00      (2006.01)
G06N 7/08      (2006.01)

(52) U.S. Cl. .............................. 706/53; 706/14; 706/12

(58) Field of Classification Search ................ 706/53, 706/14, 12; 345/424
See application file for complete search history.

(56) References Cited

U.S. PATENT DOCUMENTS

| | | | |
|---|---|---|---|
| 4,866,610 A | 9/1989 | Reiners | |
| 5,481,741 A * | 1/1996 | McKaskle et al. | 345/522 |
| 5,551,066 A | 8/1996 | Stillman et al. | |
| 5,598,564 A * | 1/1997 | Barker, III | 717/126 |
| 5,701,400 A | 12/1997 | Amado | |
| 5,701,466 A | 12/1997 | Yong et al. | |
| 5,745,712 A * | 4/1998 | Turpin et al. | 715/763 |
| 5,764,543 A | 6/1998 | Kennedy | |
| 5,838,965 A * | 11/1998 | Kavanagh et al. | 707/103 R |
| 5,844,554 A | 12/1998 | Geller et al. | |
| 5,943,244 A | 8/1999 | Crawford, Jr. et al. | |
| 5,966,535 A | 10/1999 | Benedikt et al. | |
| 5,995,945 A | 11/1999 | Notani et al. | |
| 6,031,984 A | 2/2000 | Walser | |
| 6,078,325 A | 6/2000 | Jolissaint et al. | |
| 6,085,220 A | 7/2000 | Courts et al. | |
| 6,104,874 A | 8/2000 | Branson et al. | |
| 6,119,149 A | 9/2000 | Notani | |
| 6,690,371 B1 * | 2/2004 | Okerlund et al. | 345/424 |

* cited by examiner

*Primary Examiner*—Joseph P Hirl
(74) *Attorney, Agent, or Firm*—Harrington & Smith, PC

(57) ABSTRACT

Models that encapsulate information on how remote applications are controlled and data is accessed are created to be used by a runtime agent that intelligently reasons out goal-oriented plans and execute tasks to solve problem statements generated by a user interface or other software agents.

23 Claims, 5 Drawing Sheets

APPLICATION INTEGRATION SYSTEM AND METHOD USING INTELLIGENT AGENTS FOR INTEGRATING INFORMATION ACCESS OVER EXTENDED NETWORKS

CROSS-REFERENCE TO RELATED APPLICATIONS

This application is a utility application based on Provisional Patent Application Serial No. 60/237,276 filed Oct. 3, 2000.

BACKGROUND OF THE INVENTION

Many large corporations rely on a wide variety of different and often disparate computer systems that were implemented at various times and circumstances. The multiplicity of systems adds dramatically to a company's costs. Multiplicity also reduces efficiency and a company's operational economies of scale. Also, employees require extensive training in order to be able to use each of the different systems. The cost and inconvenience of upgrading all of these components into one easy to use computer system is also enormous.

Even if a company does manage to upgrade and merge all of its operations into a single computer system, when it wants to collaborate, merge, participate in joint ventures, at least some of the above-noted problems will arise. But, many companies do not upgrade applications because of the expense involved. Thus, there are many systems still in operation that require integration, but are very difficult to integrate, such as, systems that are only terminal-accessible.

Terminal-accessible systems, such as, one that requires access via a 3270 terminal, were the predominant applications architecture prior to the proliferation of personal computers ("PC"). Unlike PCs, such terminals were not capable of running software independently of a mainframe. While use of PCs has become widespread, there are still terminals in operation, as well as many terminal-accessible systems. In many places, PCs running software called 3270 emulation connect remotely to a computer running 3270 applications. This allows a PC to connect to a terminal-accessible system through an interface that functions like a terminal.

SQL (Structured Query Language) is a standard programming language adopted by the American National Standards Institute and the International Organization for Standardization for getting information from and updating a database. Many databases, such as, Access databases, support SQL queries.

As a result of the continued use of old systems, companies have begun integrating and automating computer systems. Integration, however is not an easy task to accomplish. To integrate many different systems into one user-friendly graphical user interface ("GUI"), a program must in some way control another program or access its data directly. So, for example, while arranging a purchase, a salesman may need to: (1) access a Legacy database to verify that a product is in stock and update inventory, (2) access a separate database to update the customer's information and (3) access a separate a website and affiliated database to arrange for shipping. Accessing each of these systems is both time consuming and redundant. The salesman would have to enter the product and customer information three different times each time he/she placed an order. In addition, the salesman would have to be familiar with how to navigate each of these systems.

By integrating all of these systems into one GUI, the salesman would only have to learn one system. Moreover, that employee could be trained quicker, and would not have to re-enter the same information more than once. The difficulty would arise in designing a GUI that can navigate all three of the above-exemplified systems. As previously noted, an interface would have to be designed for each system. While one standard interface could be used for the shipping website, such as a FedEx or UPS website, each Legacy and Access database is designed specifically for the company using it. Each company has unique information that it stores in its databases about products and customers. Accordingly, for each company the arduous task of designing software to interface with its various databases must be undertaken.

There are a three distinct techniques for one computer application to talk to another computer application—through the data layer, business logic layer or presentation layer. System A's business logic layer 52 must communicate with system B's data layer 58, business logic layer 57 or presentation layer 56 to access system B 55. Access through the data layer 58 allows direct modification of the data in system B's 55 database. Unfortunately, it is extremely time consuming, expensive and error-prone to interface directly with a system's data layer. As a result, many systems do not allow any direct manipulation or access to the data.

The second method for one system to communicate with a second system is though the second system's business logic layer. For system A 50 to access system B 55 through system B's business logic layer, a transaction interface needs to be developed for system B 55. As is the problem with accessing another system through the data layer, developing a transaction interface to access a system though its business logic layer is time consuming and expensive.

The third method for one system to communicate with a second system is through the second system's presentation layer. While not nearly as expensive as creating a transaction interface to access the business logic layer or accessing the data directly, interfacing with the presentation layer has problems. A particular problem is that the integrating application must wait an appropriate length of time after entering commands to insure that the program has moved to a new state after the commands were entered. However, the time that a state change takes is erratic, so this is problematic.

Another problem is the unpredictable nature of applications in general. When an application does not go to the expected state after a command is entered, a scripted agent is unable to recover without specific instructions being written to cover that situation. This is difficult because there is a near infinite number of ways that an application can behave.

One solution to the state change problem is to program the integrating application to determine which screen it is on. If the application being controlled used screens with unique identifiers, then screen identification information is accessible. If a screen has a unique identifier, the integrating application merely has to look at the unique identifier to know what screen it is on. Only about 20% or less of Legacy systems have applications that use screens with unique identifiers, so it is not an overall solution.

Another solution to the screen recognition issue is for the programmer to select regions of the screen for the software to examine in order to determine which screen is active. However, when a host system or application has numerous different screens it can be a time consuming and error-prone task for a programmer to determine which regions will work efficiently or work at all.

A programmer also has to determine how each screen is reached and from which screens it can be reached. This requires mapping the host application. To map the host application, a list of screens is created in the order they appear during navigation. Each entry in the list includes screen identification information. Necessary information (by using, for example, key words) include: (i) the action that takes place on that screen, (ii) attention identifier keys used on that screen, (iii) the next screen to be displayed, and (iv) the time it takes to navigate from one screen to the next screen.

The next step is to create an itemized description for each screen. This description includes the type of field (read-only, button, etc.), the possible values this field could hold and the appropriate response for each possible value, whether the field can be written to, what can be written to it, the location on the screen of the field, and the length of the field for each field in each screen.

Once this information is compiled, a directed graph or state diagram is created to illustrate the operation of the system. From the directed graph or state diagram, the code to interface with a system can be written. This must be repeated for each system that is to be integrated.

As can be seen from above, even under the best circumstances, the task of integrating disparate databases and computer software is complex, time consuming and expensive. Therefore, there exists a need in the art for software to simplify the process of modeling various systems and seamlessly integrating information access over extended networks.

BRIEF SUMMARY OF THE INVENTION

The present invention simplifies the process of writing software to integrate a variety of systems. According to the present invention, models are created for terminal-accessible systems, SQL databases, and web pages. Runtime agents then use the models to intelligently navigate each system. Such agents can be used to implement systems with a single user interface.

It is, therefore, an object of this invention to provide a simplified method of modeling terminal-accessible systems, SQL databases and web pages to create intelligent agents to navigate those systems.

It is a further object of this invention to provide a computer system state recorder comprising a processor, a computer memory and a user interface stored in the computer memory including a state recorder. The state recorder records in the computer memory a planned domain file which comprises each state of the presentation layer of another computer system, the available actions from each state, and the effect of any actions available in each state through navigating the other computer system in the user interface.

It is another object of this invention to provide a processor which generates the file while a user navigates the other computer system in the user interface.

It is further an object of this invention that the processor generates the file automatically while navigating another computer system.

It yet another object of this invention that pre-conditions and post-conditions are included in the file.

It is further an object of this invention to provide a computer system screen fingerprinter comprising a processor, a computer memory and a user interface that includes a screen fingerprinter where the fingerprinter captures sections of each screen of the presentation space from a computer system and stores the captured screen sections in the computer memory so that the captured section of each screen is unique.

It is further an object of this invention that the intelligent agent generates an optimized path to a desired end state of the other computer systems based on user inputs in the intelligent agent's user interface each time the intelligent agent is run. The intelligent agent executes the optimized path by accessing each other computer system as necessary, retrieving output from the other computer systems and displaying the output in the intelligent agent's user interface.

It is further an object of this invention to provide a computer system for automatically generating constraint models from process models comprising a processor, a computer memory and at least one process model stored in the computer memory wherein the processor converts the process models into a single constraint model and stores the constraint model in the computer memory.

It is further an object of this invention that the processor converts the constraint model into a single process model and stores the process model in the computer memory.

Briefly described, these and objects of the invention are found in a computer system navigation planner comprising a processor, a computer memory, and a user interface. A fingerprinter in the computer memory captures sections of each screen of the presentation space from at least one other computer system. The captured screen is stored in the computer memory in files for each other computer system so that the captured section of each screen in each of said files is unique. The system includes a recorder to record in at least one file for each other computer system each state of the presentation layer of each other computer system. In addition, the recorder stores those keystrokes that are needed to reach each state, how to recognize each screen in the presentation layer, the available actions from each state and the effect of any actions available in each state through navigating the other computer systems in the user interface. RECORDER GENERATES A MODEL THAT CAN BE USED BY AN INTELLIGENT AGENT AND SUCH MODEL CAN BE EMBEDDED IN AN INTELLIGENT AGENT. As a result, the processor generates an intelligent agent that includes a user interface.

Other objects and advantages of the present invention will be readily apparent from the following description and drawings which illustrate the present invention.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention. It is to be understood that structural changes may be made and equivalent structures substituted for those shown without departing from the spirit and scope of the present invention.

The invention comprises a system and method of seamlessly integrating information access over extended networks using intelligent systems.

Figure 6:
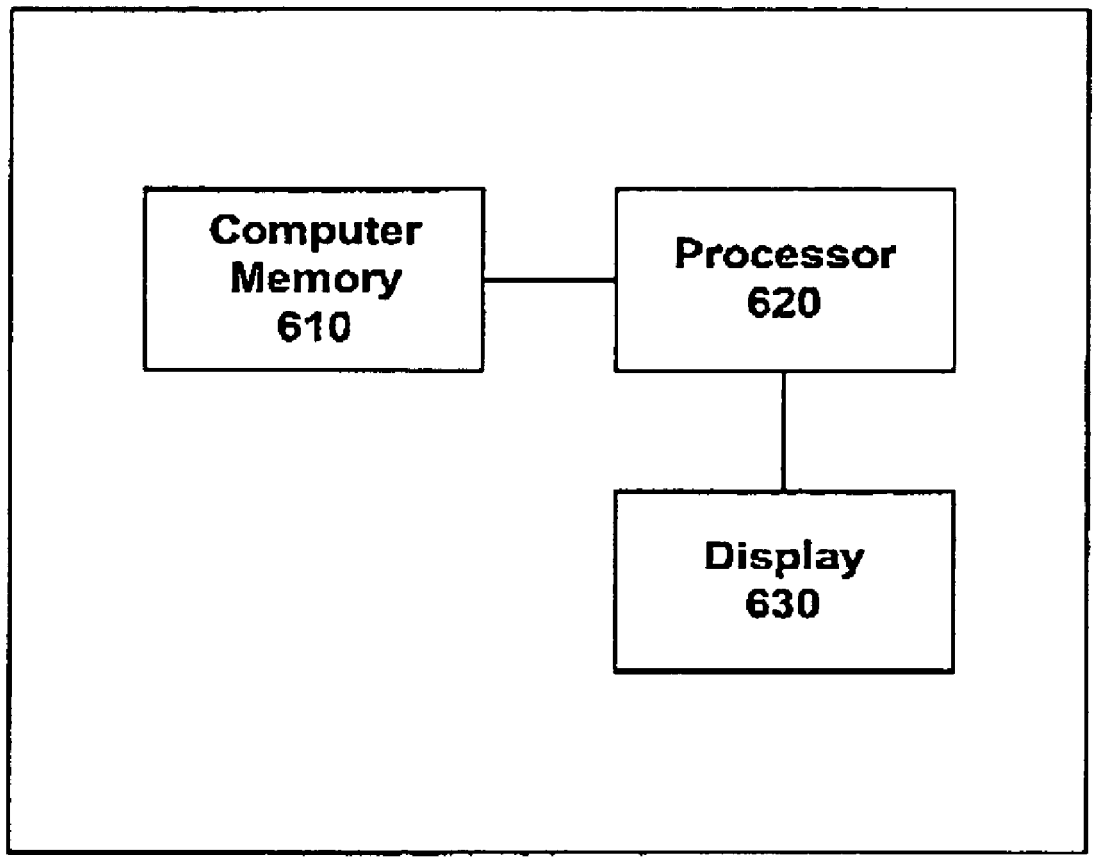
FIG. 6 is a block diagram of a computer system capable of running the developer.

In a preferred embodiment of the present invention, models that encapsulate information on how remote applications are controlled and data is accessed are created to be used by a runtime agent that intelligently reasons out goal-oriented plans and execute tasks to solve problem statements generated by a user interface. The models and runtime agent are stored in computer memory 600, as shown in FIG. 6. Processor 610 accesses computer memory 600 to retrieve the models and runtime agent as necessary.

Figure 1:
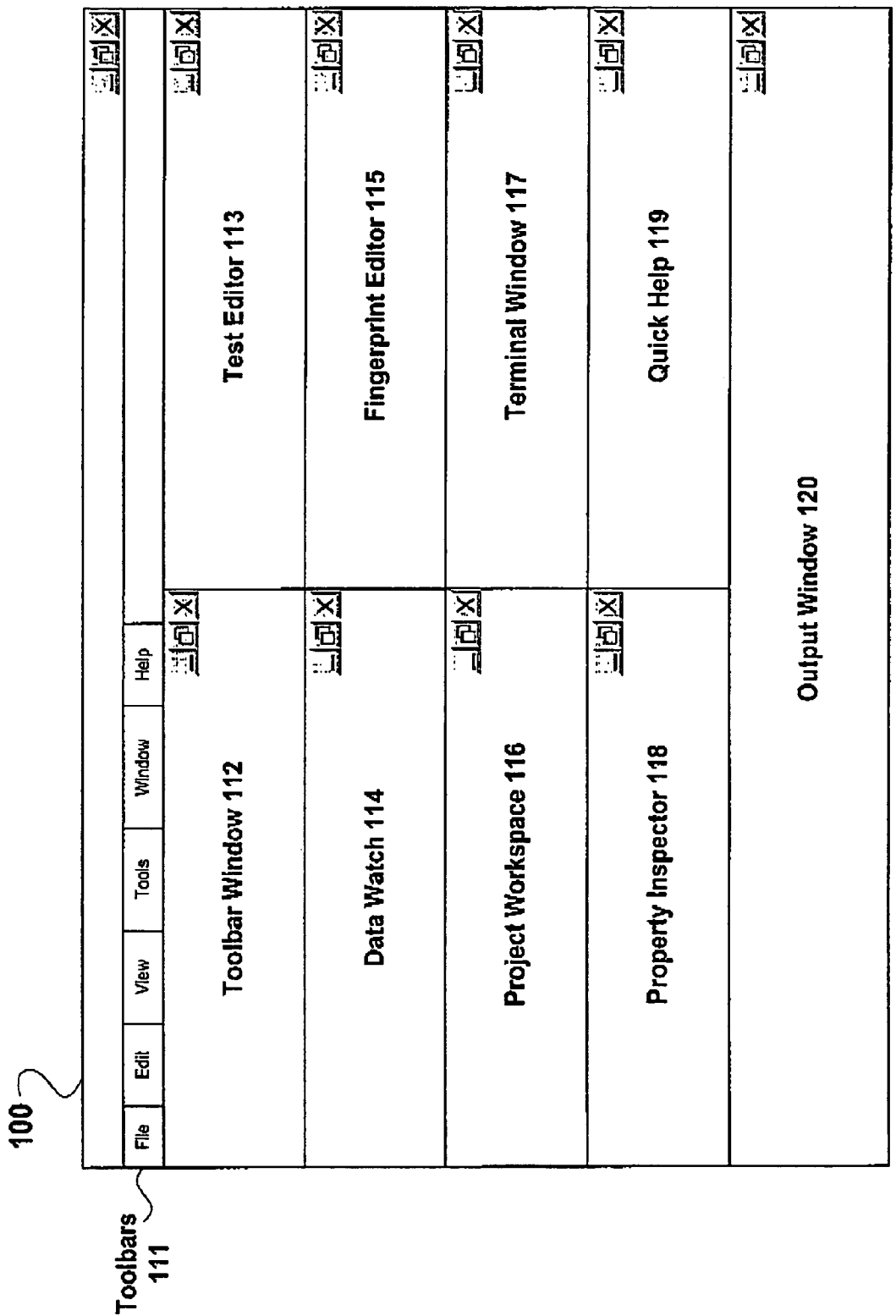
FIG. 1 is a screen shot of the developer with various windows open.

Models are created in developer 100, as shown in FIG. 1, to be used by the runtime agent. Developer 100 is also stored in computer memory 600; processor 610 accesses computer memory 600 to display developer 100 on display 630. The runtime agent will reason out a goal-oriented plan to solve the problem statement. The runtime agent generates, at runtime, a series of tasks that will accomplish the goal of the problem statement based on the models. Tasks that the runtime agent execute to accomplish the goal are navigating, retrieving data from, and writing to terminal-accessible systems, reading and writing data to terminal-accessible system screen lists, reading and writing data to SQL databases, and reading and modifying/populating an HTML document. Runtime agents can also perform actions typical of statically programmed software such as read from and write to files, modify its own database, make CICS transactions, transform data.

To create models that allow the runtime agent to accomplish this, within developer 100, the user has access to a standard toolbar 111, a test editor toolbar 112, a test editor window 113, a data watch window 114, fingerprint editor 115, project workspace 116, terminal window 117, property inspector 118, help window 119 and an output window 120.

The standard toolbar 111 and the editor toolbar 112 allow easy access to commonly used features. The test editor 113 allows the user to check how complete and accurate the models are by accessing the runtime agent and simulating the tasks it would be required to perform at runtime. In addition, the test editor 113 generates a graphical representation of navigation plans as well as allowing the user to execute the plans and observe the interactions the runtime agent makes with the SQL databases, terminal screens and web pages. The display and/or execution of plans can also be illustrated step by step for debugging.

Data watch window 114 allows the user to view the current value for any data member in the current project. The fingerprint editor 115 is an intelligent technology used for terminal screen state recognition. It uses a set of predefined patterns and regions as a default fingerprint schema that work for most terminal systems.

The project workspace 116 allows the user to view and access the various elements of a project within the sessions tab, the project tab and the templates tab. The session stab is used to manage connections to live host systems or simulations of live host sessions called offline sessions. The project tab is used to manage a project when building an access model to add or edit objects, state members, methods, instructions, data objects and data members. The templates tab is used to create and configure listmap objects. Listmap objects allow the user to navigate through terminal screens that present data in lists, and manipulate the data retrieved from lists.

Multiple systems can be controlled within a single model. However, rather than requiring a programmer map the host application and create an itemized description by writing down each detail, developer 100 simplifies the process. The following discussion will explain how developer 100 simplifies the process of creating an SQL database access model, a terminal-accessible system access model, a web page access model and a runtime agent that can use each of these models, or a model containing any combination of these applications, to intelligently navigate the various systems.

Before any models can be created, developer 100 must start a new project. Once the new project is open, the user must start by modeling one of the systems to be integrated. The method of modeling an SQL database, terminal applications, and web pages are discussed, by any type of application can be modeled.

Figure 2:
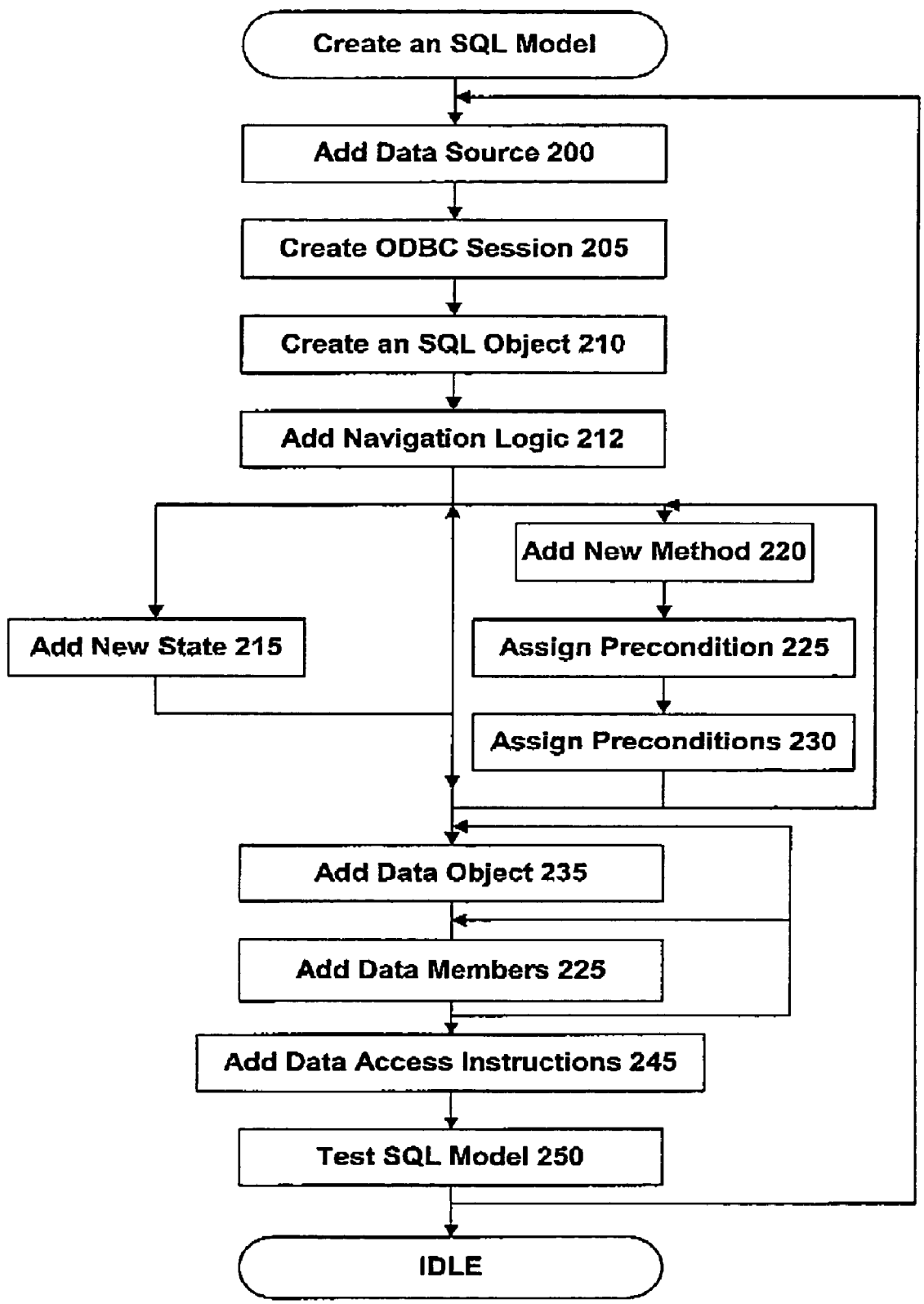
FIG. 2 is a flowchart of the creation of an SQL model.

A model for interacting with an SQL database allows the runtime agent to plan instructions for querying an SQL database. The instructions manage the database connections as well as the SQL queries. Before such a model can be created, the data source must be added 300 to the list of available databases, as shown in FIG. 2. The data source is the database that a model is being built to interact with.

Once the data source is added 200 to the list of available databases, the user must set up developer 100 to view the data source activity while developing the SQL model.

Once developer 100 can view the data source, an SQL model can be built. The first step is to create an SQL object 210. An SQL object contains the information necessary to facilitate reading from and writing to the data source. It contains the methods and data structures—what information comprises each data source entry and the properties of each piece of information.

Next, navigation information must be added 212. Navigation information allows the runtime agent to plan navigation paths that achieve goals. To add navigation information, state members 215 and methods must be created 220. State members represent a condition or position of the system. A method groups instructions, which are definitions of operations that are performed—instructions to go from one state to another.

Once, at a minimum, start and finish states are created 215, methods need to be created 320. The methods contain the instructions that the runtime agent will execute in the navigation. Once the new method is added 220, the user must enter a precondition 225 and a post-condition 230 for the new method. The precondition specifies that for the selected method, the selected state is the is the initial point for navigation. The post-condition specifies that for the selected method, the selected state is the end point for navigation.

Once the preconditions 225 and post-conditions 230 are specified, a data object may be added 235. A data object stores intermediate data that can be used to write to a system—i.e. the data retrieved by the instructions. Data objects contain data members. Data members are variable where information may be stored, for example, data retrieved from an SQL query; where data to be transformed is stored; and data that will be written to an external system is stored. The runtime agent can read data from and write data to the data members. Once the data object is created, it appears in project workspace 116. Next, data members must be added 240 to the data object. Data members are information, such as, ID, password, name, address, etc. For updating information, such as incrementing an entry in a database, data members are not necessary, constants can be used.

After the data members are added 235 to the data object, data access instructions must be added 245. Data access instructions are definitions of operations that can be preformed; they are contained within methods. It is in the data access instructions that SQL queries are written.

The steps described above can be repeated as often as necessary to accurately model the interaction with an SQL database. In addition, the interaction with multiple SQL databases can be modeled and added to a project if more than one SQL database must be accessed. Once an SQL model is complete developer 100 can test it to make sure it works properly. Output window 120 displays feedback while the SQL model is tested. At the same time, data watch 114 allows the user to view the current value for and data member in the project. The runtime agent plans navigation paths that will execute the methods and instructions required to connect to a data source and execute SQL queries.

Figures 3, 4:
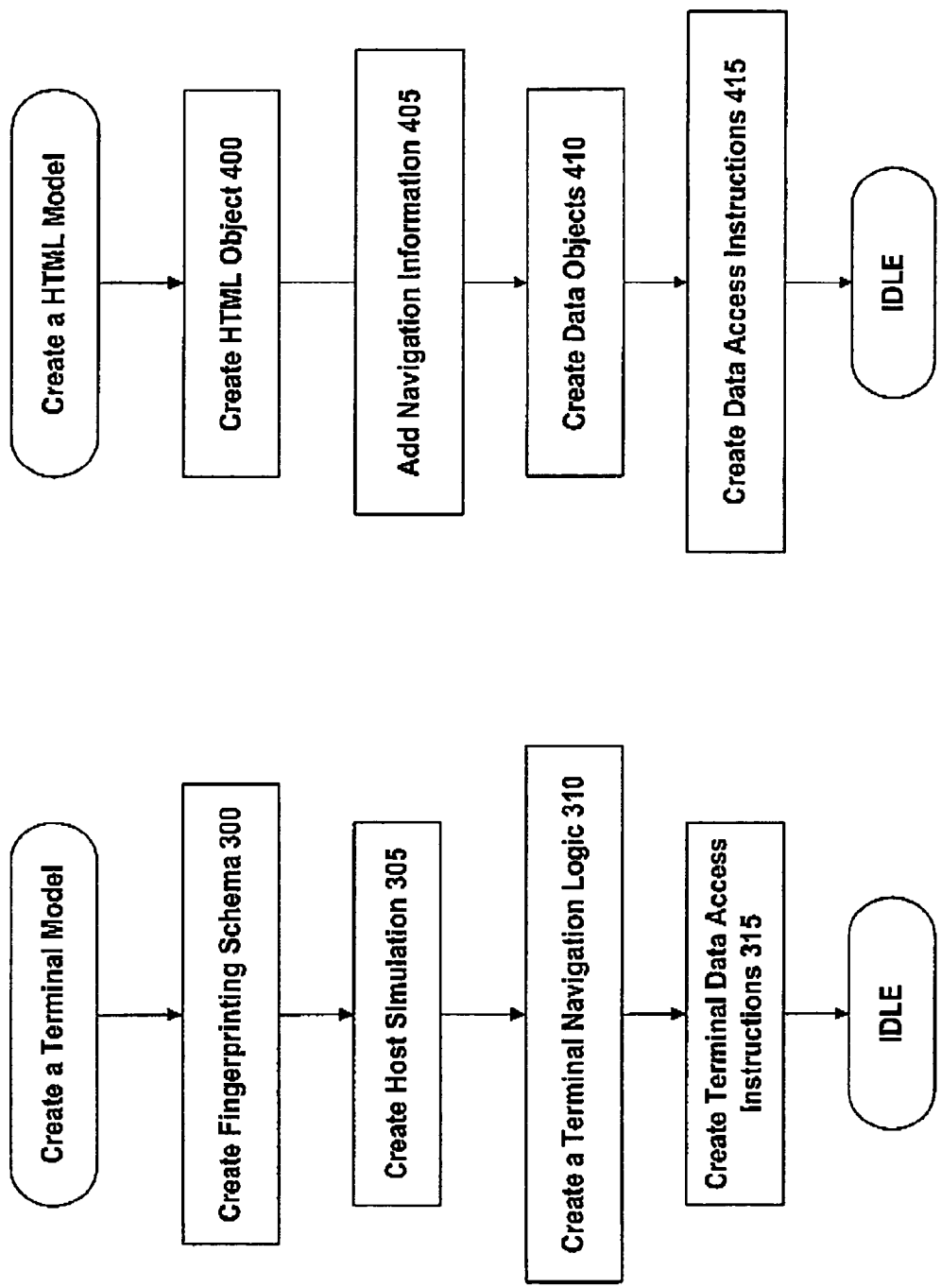
FIG. 3 is a flowchart of the creation of a terminal-accessible system model.
FIG. 4 is a flowchart of the creation of an HTML model.
Figure 5:
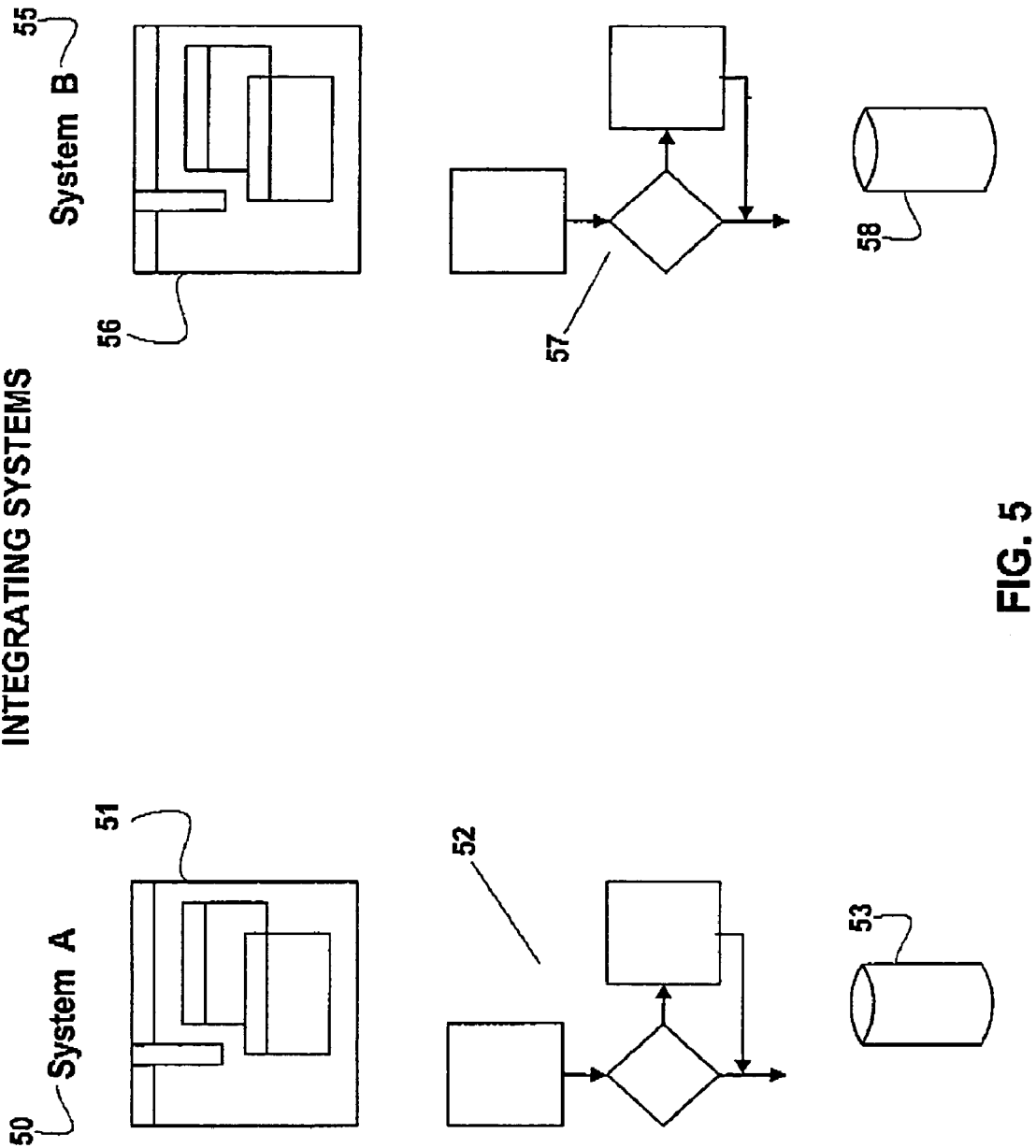
FIG. 5 is a block diagram of two computer applications.

In addition, a user can create a terminal access model. A terminal access model allows a runtime agent to plan instructions that need to be executed to control terminal applications and systems and read and write data to the screens. As seen in FIG. 3, the first step in creating a terminal access model is to create a fingerprinting schema 300. Fingerprinting schema are sets of rules that define how the fingerprinting system functions. Fingerprinting is terminal screen state recognition. Developer 100 uses a predefined set of patterns and regions as a default fingerprinting schema. This default configuration will result in accurate screen recognition for most host systems and applications, but can be reconfigured for special cases.

Fingerprinting relies on matching pattern and region information to terminal screens, based on a decision tree. The patterns are special conditions that evaluate a terminal screen by looking for a features, for example text strings, dates, times and character attributes such as color. Each feature can be searched for in several ways including exact position matches, region matches, exclusion, substring matches and so on. A pattern is captured and can be compared to a string to return a true or false for a match or can be evaluated more generally, for example, is there a date (regardless of what date) in a particular portion of the screen. The patterns can be evaluated as logical expressions. The values returned are used to navigate the decision tree.

The regions are definitions of sections of the terminal screen. The sections can be defined in several ways including set character lengths and blocks that span multiple rows and columns. When a region is evaluated, a string of text captured from the defined region is compared to string to return a value. The values returned, in conjunction with the values from pattern comparisons, are used to navigate the decision tree. There are also special region types that result in predefined integers or special codes being returned.

The decision tree used for the fingerprinting schema uses a region and pattern combinations for each node. As the first node of the decision tree is traversed, the pattern for the node is evaluated; if the pattern is false, then the next node of the decision tree is traversed. If the pattern for the first node is true, then the region for the node is evaluated, and the result is stored as a fingerprint "element." The node of the tree that the screen matched and the element that was stored are the fingerprint of the screen.

To create a decision tree, unique features of each screen within the terminal application need to be identified. Screens can often be identified based on features they share, such as the titles on menu screens, screen ID numbers, or the system date or time displayed on the top or bottom line. The fingerprinting schema, however, should not identify regions of a screen containing data that dynamically changes.

If the default fingerprinting schema does not work for a particular set of terminal screens, the user can modify it by changing the patterns and regions so that it will work for that set of terminal screens.

A host simulation can be created 305 to perform offline tests. One way to create a host simulation is activate the recorder. The recorder is a feature that intelligently creates host simulations and navigation models by capturing user interaction with terminal applications and systems. The recorder uses the fingerprinting schema to create fingerprints for each new screen it recognizes while navigating. The recorder captures offline screens and creates corresponding terminal objects and state members in the terminal model, captures user interaction with the host as offline logic items, and creates corresponding methods and instructions in the terminal access model. It also creates data objects and members for any terminal screen unprotected regions it encountered while recording. All of these items are labeled using an intelligent naming mechanism based on the elements captured during fingerprinting and other screen features.

The terminal host simulation created by the recorder can be used to test the navigation logic in the terminal model without having to connect to the live host.

Another type of model is an HTML control model. An HTML control model allows the runtime agent to plan instructions that need to be executed to retrieve HTML documents and extract data from them or to write data to a web server. Developer 100 uses two HTML-specific instructions to accomplish this—send HTTP request and extract HTML data.

There are two kinds of HTTP requests. The send HTTP request instruction allows the runtime agent to send an HTTP request and store the HTML document returned. The HTTP request can be written manually or can be generated by developer 100 and modified as required. The extract HTML data instruction allows the runtime agent to extract data from an HTML document retrieved using the send HTTP request instruction. Developer 100 intelligently extracts structured and unstructured data into data objects and data members. This data can then be retrieved by the client application or used by the runtime agent.

As seen in FIG. 4, creating an HTML model has four steps. The first step is to create an HTML object 400. An HTML object serves as a container to encapsulate the methods and data structures (data objects, data members, and state members) created to extract data from an HTML document.

Once the HTML object is created 400, navigation information must be added 405. Navigation information allows the runtime agent to plan navigation paths that execute the methods and instructions. Adding navigation information comprises creating state members and creating a method. State members represent a condition or position of the system. A method groups instructions, which are definitions of operations that are performed (i.e. a method contains instructions to go from one state to another). The state members, method and instructions created are used by the runtime agent to plan navigation paths that execute the data access instructions.

The next step is to create data objects and members 410. Data objects and their members are used to hold various types of information such as the HTTP request information required to retrieve the HTML document and the data extracted. Because HTML data can be formatted in structures such as lists and tables, developer 100 supports the extraction of data from web pages into specially-named sets of data objects and data members that maintain the structural context. One object is created for use by HTML instructions while another stores the data from a web page.

Finally, HTML data access instructions must be created 415. Data access instructions are added to the method to send an HTTP request and extract data from the returned HTML document. HTML data access instructions are definitions of operations that can be performed.

While the invention has been described with reference to an exemplary embodiments various additions, deletions, substitutions, or other modifications may be made without departing from the spirit or scope of the invention. Accordingly, the invention is not to be considered as limited by the foregoing description, but is only limited by the scope of the appended claims.

What is claimed as new and desired to be protected by Letters Patent of the United States is:

1. A computer system computer application screen fingerprinter, said computer system comprising:
   a processor;
   a computer memory coupled to said processor; and
   a screen fingerprinter stored in said computer memory, wherein said fingerprinter comprises a decision tree that selects at least one region and/or pattern of screens of a presentation space of a computer application to be captured such that an occurrence of the at least one region and/or pattern enables the decision tree to uniquely identify each of the screens.

2. A computer system as in claim 1, wherein said fingerprinter allows a user to modify which portion of a screen comprises said region and/or pattern and which attributes of said region end/or pattern to examine.

3. A computer system as in claim 1, wherein said fingerprinter creates the decision tree based on said at least one region and/or pattern such that after each screen is compared to the region Or pattern at each decision node1 a screen identifier will come to a different end node of said decision tree for each screen.

4. A computer system as in claim 3, wherein said fingerprinter allows a user to modify said decision tree by modifying the comparisons at the decision nodes.

5. A computer system computer application recorder, said computer system comprising: a processor; a computer memory coupled to said processor; a user interface and a recorder stared in said computer memory, wherein said recorder records in said computer memory a knowledge base which comprises each screen of the presentation layer of a computer application, the keystrokes and/or programs necessary to reach each state, the available actions from each state of each screen and the effect of any actions available in each state through navigating said computer application in said user interface.

6. A computer system as in claim 5, wherein said processor generates said file while a user navigates said another computer system in said user interface.

7. A computer system as in claim 5, wherein said processor generates said file while automatically navigating said another computer system.

8. A computer system as in claim 5, wherein a fingerprint of each screen is included in said knowledge base.

9. A computer system as in claim 5, wherein pre-conditions and post-conditions for each state are included in said knowledge base.

10. A computer system navigation planner, said computer system comprising; a processor; a computer memory coupled to said processor; at least one computer application model stored in said computer memory; and a navigation planner stored in said computer memory; wherein when said navigation planner receives a problem statement, said navigation planner accesses said at least one computer application model to create a plan of solving said problem statement and executes said plan.

11. A computer system as in claim 10, wherein when said plan fails, said navigation planner creates a new and different plan to solve said problem statement.

12. A computer system computer application model generator, said computer system comprising:
   a processor;
   a fingerprinter;
   a recorder; and
   a user interface;
   wherein said fingerprinter selects at least one region and/or pattern of the screens of the presentation space of a computer application to be captured such that said at least one region and/or pattern of each screen is unique;
   wherein said recorder records in said computer memory a knowledge base which Comprises each screen of the presentation layer of a computer application, the keystrokes and/or programs necessary to each screen, a fingerprint of each screen, the available actions from each screen and the effect of any actions available in each screen through navigating said computer application in said user interface;
   wherein additional relationships between said screen and said knowledge base can be input through said user interface such that said computer application model generator can model said computer application.

13. A method of uniquely identifying the screens of the presentation layer of a computer application comprising the steps of: taking a screen capture of each screen of the presentation layer of a computer application; selecting areas of said screen captures to be examined for the presence of an attribute in said area; and creating a decision tree such that each of said screen captures has a unique end node of said decision tree.

14. A method as in claim 13, wherein said areas are selected automatically.

15. A method as in claim 13, wherein said areas are selected manually.

16. A method as in claim 13, wherein said decision tree is created manually.

17. A method as in claim 13 further comprising: of accessing said computer application; navigating said computer application; and recording in a knowledge base each screen of the presentation layer of said computer application, keystrokes and/or programs necessary to reach each state of each screen of said computer application, the states of each screen, available actions from each screen and the effect of any actions taken on each screen.

18. A method as in claim 17, wherein said computer application is navigated automatically.

19. A method as in claim 17, wherein said computer application is navigated manually.

20. A method comprising; receiving a problem statement at a computer system, the problem statement specifying at least one goal; accessing at least one computer application model that encapsulates information on how at least one computer application operates; using a navigation planner in combination with the computer application model to plan at least one path through said at least one computer application tat will achieve the at least one goal of said problem statement; and executing said at least one path.

21. A method of modeling computer applications comprising the steps of: taking a screen capture of each screen of the presentation layer of a computer application; selecting areas of said screen captures to be examined for the presence of an attribute in said area; creating a decision tree such tat each of said screen captures has a unique end node of said decision tree; accessing said computer application; navigating said computer application; and recording in a knowledge base each screen of the presentation layer of said computer application, keystrokes and/or programs necessary to reach each state of each screen of said computer application, the states of each screen, and the effect of any actions taken on each screen.

22. A method as in claim 21, further comprising the steps of; allowing a user to insert additional relationships and commands into said knowledge base.

23. A system for navigating an application comprising:
a processor;
a computer memory coupled to the processor;
a screen fingerprinter stored in said computer memory, wherein said Mgerprinter comprises a decision tree that selects at least one region and/or pattern of screens of the presentation space of a computer application to be captured such that an occurrence of the at least one region and/or pattern enables the decision tree to uniquely identify each of the screens;

a recorder stored in the computer memory, the recorder recording a knowledge base which comprises the plurality of screen captures, one or more inputs and/or programs necessary to reach the application states indicated by each of the screen captures, one or more actions available from each of the states, and the effects of undertaking each of the actions available from each of the states; and a navigation planner that receives a problem statement, creates a plan of solving the problem statement by using the knowledge base, and executes the plan, wherein the creating of the plan by the navigation planner comprises the navigation planner dynamically analyzing a current screen to determine a current state, determining a desired state associated with the problem statement, and dynamically identifing a sequence of the actions from the current state need to achieve the desired state.

* * * * *

UNITED STATES PATENT AND TRADEMARK OFFICE
CERTIFICATE OF CORRECTION

PATENT NO. : 7,269,580 B2
APPLICATION NO. : 09/801795
DATED : September 11, 2007
INVENTOR(S) : Matichuk It is certified that error appears in the above-identified patent and that said Letters Patent is hereby corrected as shown below:

In Claim 2: Column 8, line 38, delete "end" and replace with --and--.
In Claim 3: Column 9, line 42, delete "Or" and replace with --or--.
In Claim 3: Column 9, line 42, delete "node1" " and replace with --node--.
In Claim 5: Column 9, line 51, delete "stared" and replace with --stored--.
In Claim 12; Column 10, line 28, delete "Comprises" and replace with --comprises--.
In Claim 17: Column 10, line 53, delete "of".
In Claim 20: Column 11, line 5, delete "tat" and replace with --that--.
In Claim 21: Column 11, line 11, delete "tat" and replace with --that--.
In Claim 23: Column 11, line 27, delete "Mgerprinter" and replace with --fingerprinter--.

Signed and Sealed this

Eighteenth Day of December, 2007

JON W. DUDAS
*Director of the United States Patent and Trademark Office*